United States Patent [19]

Richardson et al.

[11] Patent Number: 5,233,867
[45] Date of Patent: Aug. 10, 1993

[54] LEVER-OPERATED DYNAMIC FLUID FLOW SENSING SYSTEM

[76] Inventors: Thomas W. Richardson, 3969 Lakewood, Waterford, Mich. 48329; Robert G. Malcolm, 1849 Watkins Lake Rd., Waterford, Mich. 48328

[21] Appl. No.: 969,046

[22] Filed: Oct. 30, 1992

Related U.S. Application Data

[63] Continuation of Ser. No. 684,065, Apr. 11, 1991, abandoned, which is a continuation-in-part of Ser. No. 389,123, Aug. 3, 1989, Pat. No. 5,007,286.

[51] Int. Cl.⁵ .......................................... G01C 21/10
[52] U.S. Cl. .................................. 73/186; 73/861.75
[58] Field of Search ............... 73/186, 181, 861.74, 73/861.75, 861.76

[56] References Cited

U.S. PATENT DOCUMENTS

| | | | |
|---|---|---|---|
| 2,315,756 | 4/1943 | Warner | 73/212 |
| 2,601,678 | 6/1952 | Beaty | 73/861.74 |
| 3,084,543 | 4/1963 | Finkl et al. | 73/182 |
| 3,181,356 | 5/1965 | Carpenter | 73/182 |
| 3,349,615 | 10/1967 | Finkl | 73/182 |
| 3,482,444 | 12/1969 | Jefferson | 73/186 |
| 3,596,513 | 8/1971 | Sandstedt | 73/181 |
| 3,719,078 | 3/1973 | Pastan | 73/181 |
| 3,720,102 | 3/1973 | Ogg | 73/186 |
| 3,746,985 | 7/1973 | Perron | 324/166 |
| 3,777,561 | 12/1973 | Lewis | 73/181 |
| 3,782,193 | 1/1974 | Meyer et al. | 73/181 |
| 3,878,714 | 4/1975 | Protta et al. | 73/186 |
| 3,978,725 | 9/1976 | Hadtke | 73/182 |
| 4,068,206 | 1/1978 | Popp | 338/36 |
| 4,070,909 | 1/1978 | Carpenter | 73/182 |
| 4,163,396 | 8/1979 | Waugh | 73/721 |
| 4,205,552 | 6/1980 | Refoy | 73/182 |
| 4,226,125 | 10/1980 | Waugh | 73/708 |
| 4,271,700 | 6/1981 | Tschanz et al. | 73/181 |
| 4,759,216 | 7/1988 | Carpenter et al. | 73/182 |
| 4,809,547 | 3/1989 | Warrow | 73/183 |
| 4,821,567 | 4/1989 | Nakamura et al. | 73/182 |
| 5,007,286 | 4/1991 | Malcolm | 73/181 |

FOREIGN PATENT DOCUMENTS 5210783 7/1975 Japan .
WO91/02218 2/1991 PCT Int'l Appl. .

OTHER PUBLICATIONS

Pamphlet from IC Sensors on "Model 84".
Pamphlet from IC Sensors Titled "Gain Programming Using an IC Pressure Sensor" Dated Mar. 1985.

Primary Examiner—Donald O. Woodiel
Attorney, Agent, or Firm—Basile and Hanlon

[57] ABSTRACT

A dynamic fluid flow measurement apparatus is intended to be connected to a relative reference member, such as a marine vessel. The apparatus preferably includes a base member, a lever mechanism movable relative to the base member for transmitting force corresponding to direct dynamic fluid flow pressure applied to the lever mechanism, and a signal generator disposed in the base member for actuation by the lever mechanism. The signal generator generates an output signal corresponding to the force transmitted through the lever mechanism in response to fluid flow passed the relative reference member. In the preferred embodiment, the signal generator takes the form of a solid state pressure sensing transducer, such as a piezoresistive transducer sensor for sensing force transmitted through the lever mechanism. A central processing unit is provided in the preferred embodiment for receiving the electronic output signal from the signal generator and for generating a processed electronic output signal in accordance with a control program stored in memory. A display can be provided for receiving the output signal and for displaying a visual readout of information, such as relative speed of the fluid flow or marine vessel, based on the output signal.

20 Claims, 3 Drawing Sheets

LEVER-OPERATED DYNAMIC FLUID FLOW SENSING SYSTEM

RELATED APPLICATIONS

The present application is a continuation of application Ser. No. 07/684,065 filed on Apr. 11, 1991 now abandoned, which is a continuation-in-part application to the currently co-pending application Ser. No. 07/389,123 filed on August 3, 1989, issued as U.S. Pat. No. 5,007,286 on Apr. 16, 1991.

FIELD OF THE INVENTION

The invention relates to a flow-meter apparatus for measuring relative fluid velocity, and more particularly, to a marine speedometer instrument used in the measurement of a marine vessel's speed, and a dynamic fluid flow measuring instrument used in the measurement of confined fluid flow characteristics such as pressure, velocity and/or flow rate.

BACKGROUND OF THE INVENTION

Typically, marine speedometer systems use either pitot tube or paddle wheel type devices to measure vessel speed. The pitot tube senses stagnation pressure as a function of speed, while the paddle wheel supplies output pulses that are counted to indicate speed. The devices are usually mounted on the stern or the bottom of the vessel. It is common in the art to provide redundant marine speedometer systems as a backup for accuracy or dependability. Unfortunately, there are times when both the primary and redundant marine speedometer systems are inoperative. Problems occur most frequently when using a pitot tube on weedy inland lakes. When the pitot tube is partially clogged or blocked by weeds or other debris, a lower than actual speed will be indicated by the marine speedometer system. System response time is also usually slow enough that excessive time, i.e., on the order of one to two seconds lag time, is required for the meter to catch up to the actual vessel speed. The paddle wheel devices experience problems in the form of mechanical wear, corrosion and inaccuracy due to rotational resistance, in addition to variations due to vessel rolling, i.e., lateral angle of the vessel from uneven load distribution.

SUMMARY OF THE INVENTION

To overcome all of the perceived disadvantages of the prior systems discussed above, the present invention uses a completely protected signal generator. The present invention discloses using a paddle, a spring-loaded trip-up mechanism, an arm and a base member as a lever-operated dynamic fluid flow sensing system. In the simplest form, a base member is mounted to the boat transom with a pressure sensor supported between the base member and a lever or paddle. The lever or paddle may appear similar to existing pitot tube type pressure transducers, but is modified since no pitot tube is used in the present invention. The paddle reacts against the fluid pressure directly when there is relative movement between the paddle and the fluid, without resorting to the use of a pitot tube port within the paddle. A spring-loaded trip-up mechanism prevents the paddle from being broken off, if a predetermined trip-up force is exceeded by contact with debris within the fluid to be measured, or to flip up the paddle for trailering. The arm contains the trip-up mechanism and is pinned or hinged to the bottom of the base member. The arm may also contain a rubber coupler or other resilient pressure application pad to evenly distribute the paddle force against the face of the sensor diaphragm when the sensor is squeezed between the base member and the arm as pressure is applied to the paddle.

The pressure sensor is coupled to the flowing fluid through a lever and, therefore, is not in direct contact with the fluid. Any direct debris contact to the sensor is now eliminated, as is damage due to denting or puncture. Any water debris contacting the lever arm will, at most, force the arm against a stop on the base member. This will limit pressure to the sensor and also prevent damage to it, thereby saving the most expensive part of the transducer assembly. Since the sensor is housed within the base member, it is protected by the boat transom on one side and by the arm on the other side. Therefore, there is no need to be concerned about damage due to handling or washing. Once the sensor is installed into the base member, the arm moves with respect to the base member around the pivot pin until the arm is latched in operable position to the base member. The latch then holds the arm and paddle assembly in the proper position.

The paddle contains a small area toward the submerged end which is significantly larger than the remainder of the paddle. This is of particular benefit at lower speeds where the total pressure variation on the paddle is reduced as it changes depth in the water due to boat speed or angle of attack and results in a more accurate reading at any speed. As a way to tailor the transducer assembly for a wider dynamic speed range, the paddle area and/or arm length can be changed. A larger area and longer paddle for use with slower speeds, and a smaller area and shorter paddle for use with faster speeds would allow the use of the same pressure sensor for several applications. In any case, the trip-up mechanism and predetermined trip force could remain the same for all practical purposes.

The lever assembly that couples the paddle force to the sensor includes the paddle and the arm. The ratio of effective lever lengths from the effective paddle center, representing a point force equivalent to the distributed force, to the pivot pin divided by the length from the sensor's effective center to the pivot pin, are factors that can determine the desired amount of sensitivity and gain of the total system. The sensor wires exit toward and through the boat transom. O-ring seals are placed between the sensor and the base member, and also between the base member and the transom to prevent water from leaking from the arm side, or in between the base and the transom. The sensor wires are brought through the transom and elevated above any wetness to maintain dry sensor circuitry and also for proper venting. The wires may be sealed in potting compound or a waterproof tube to further ensure sensor circuitry dryness and venting. While the intended use of this system is to measure vessel speed relative to the unconfined media, such a system could also be used to measure confined flow, such as media flowing through ducts, pipes, conduits or the like.

The preferred sensor used in the present invention is normally used to measure hydrostatic pressure. In order to adapt the sensor for use in measuring dynamic fluid pressure relative to an unconfined media, the sensor is uniquely mounted into a base member. The assembly is fastened to the boat transom or stern such that an exposed lever or paddle is slightly below the boat bottom.

The base member is designed to protect the sensor, while the lever or paddle is designed to maximize dynamic pressure sensitivity by resolving the largest pressure component possible, while minimizing drag, fluid spray and any tendency to catch debris. While this particular design does not preclude other mounting techniques with similar advantages, it does allow for immediate original equipment manufacturer applications as well as after market applications with minimum vessel modifications.

As fluid pressure is applied directly to the lever or paddle, the force is amplified by leverage, i.e., force acting through a distance, while being transmitted to the sensor diaphragm. The lever pressure on the sensor diaphragm causes an internal pressure transfer to a piezoresistive element via a coupling fluid, with virtually no physical movement, thus reducing any mechanical criticality. The pressure applied to the lever assembly is transmitted to the sensor diaphragm by a pressure application pad selected of a material to evenly distribute the transmitted force over the active area of the sensor diaphragm. The lever assembly could be hinged at a spring-biased joint so as to be tripped up at a predetermined force to prevent transducer assembly or vessel damage upon contact with debris, or during shipping or trailering.

The base member is designed to house the signal generator or sensor so that the sensor leads or connections are isolated from the fluid. A spanner nut can be used to compress an O-ring between the sensor and the base member, thereby creating a water tight seal or an O-ring can be fitted on the sensor diameter to maintain a water-tight seal and retain the sensor in the base member mounting position. Other mounting options include injection molding the sensor with its wires and connectors in place, or molding the base member in two halves, pressing the two halves together and sonically sealing the sensor in between. In any case, the sensor wires can be brought out of the base member or holder directly and passed through the transom or passed through a bulkhead connector or other mounting bracket or assembly.

Electronic circuitry supplies the proper signals and power to the sensor, and converts the sensor output to an electronic signal suitable for further processing. Central processing means converts the electronic signal, as provided by the electronic circuitry, to a value of speed. In determining the value of speed, the central processing means interprets the dynamic pressure characteristics of the pressure sensor assembly as a function of vessel speed. While the transducer assembly can communicate with the central processing unit through modulations of frequency, voltage or the like, it is preferable to convert the control signal into digital form for transmission to the central processing unit.

The central processing means may also use the following inputs as information to further enhance system accuracy and flexibility. The vessel inclination, i.e., vessel pitch or angle of attack, can be used as an additional input to further enhance system accuracy and flexibility. In this configuration, vessel inclination is provided to the central processing means by an inclination sensor that is used, along with other possible inputs, to give an accurate measure of vessel speed that is independent of vessel inclination. Vessel configuration or hull-shape compensation, particularly transom angle, can also be used as an additional input to further enhance system accuracy and flexibility. Sensor pressure, and therefore speed values, may be influenced by the particular hull shape or vessel configuration on which it is installed. Combinations such as engine option, seating arrangement, transom angle or load bias characteristics are some of the possible configurations. The system may be mechanically or electronically pre-set at the factory or dealer to conform to the particular vessel hull shape configuration. Electronically variable speed adjustment may also be used as an additional input to further enhance system accuracy and flexibility. The vessel operator may have the option to adjust the displayed speed to compensate for water conditions that may affect sensor pressure at a given speed. This may also be done to set the vessel speed as a function of a ski course length for consistency among vessels during the same competition skiing event. Water density and/or temperature may also be used as an additional input to further enhance the system accuracy and flexibility. These inputs may be provided to the central processing units by respective density and temperature sensors, combined with other appropriate inputs and used by the control program in the central processing unit to determine a compensated vessel speed such that accurate vessel speed is independent of variations in fluid density or temperature.

The central processing unit can also control the display device electronics with software designed to display the values of speed in a smooth, easily readable manner. The display device can indicate the speed value by means of digits, bar graphs, needles or other means based on various display technologies such as light emitting diodes, vacuum fluorescent, liquid crystal or the like.

The present invention provides a system for the accurate measurement and display of marine vessel speed. The system is designed to operate in all marine media or waterways without being affected by weeds or debris common to waterways. The preferred system consists of a solid state pressure sensor to monitor the dynamic pressure applied to the sensor due to vessel movement, electronic logic to convert the sensor output to an electronic signal, a microprocessor or other central processing means to convert this electronic signal to a value of speed, and additional electronic circuitry and display devices to display speed value to the vessel operator. The present invention positions the signal means, i.e., a pressure responsive signal generator, such as a solid state pressure sensor or closed hydraulic circuit, in a base member protected from direct impact by debris carried in the fluid flow to be measured. This protection is important for expensive components, such as the solid state pressure sensing piezoresistive transducer, which is costly to replace. In addition, the present invention actuates the signal means through lever means movable with respect to the base member. The lever means preferably provides leverage to amplify the force transmitted to the signal means, allowing the use of smaller, higher pressure responsive, solid state piezoresistive transducers. Consequently, the present invention should be even more durable, reliable and more easily adaptable for various speed range applications than the first generation of solid state transducer based fluid flow measurement systems as disclosed in our co-pending application, to be issued as U.S. Pat. No. 5,007,286 on Apr. 16, 1991.

Various embodiments and configurations of the present invention described herein will make these and other desirable characteristics and advantages of the present invention apparent to those skilled in the art.

Other advantages, objects and features of the invention will become apparent by reference to the following specification and to the drawings.

BRIEF DESCRIPTION OF THE DRAWINGS

In the drawings, like reference numerals refer to the same elements throughout the various views, and wherein.

DESCRIPTION OF THE PREFERRED EMBODIMENT

The present invention is a lever-operated dynamic fluid flow measurement system for measuring relative fluid velocity, such as a marine speedometer in an unconfined media to indicate speed of a vessel. The dynamic fluid flow measurement system of our previous co-pending patent application Ser. No. 07/389,123 filed Aug. 3, 1989, to be issued as U.S. Pat. No. 5,007,286 on Apr. 16, 1991, is incorporated by reference herein in its entirety. The system includes dynamic fluid flow measuring means, designated generally 10, intended to be connected or supported from a relative reference member, such as a marine vessel or pipe wall. The dynamic fluid flow measuring means 10 is best seen in FIGS. 1-3 and 5. The dynamic fluid flow measuring means 10 preferably includes a base member or portion 12 for connection to the bottom, stern or transom of a marine vessel. The dynamic fluid flow measuring means 10, in its simplest form, also includes lever means, designated generally as 14, for transmitting force corresponding to dynamic fluid flow pressure directly applied to the lever means. The lever means 14 is movable relative to the base member 12 in response to fluid flow passed the relative reference member. Signal means are disposed in the base member 12 for actuation by the lever means 14. The signal means 16 is for generating an output signal corresponding to the force transmitted through the lever means 14 in response to fluid flow passed the relative reference member.

Figure 1:
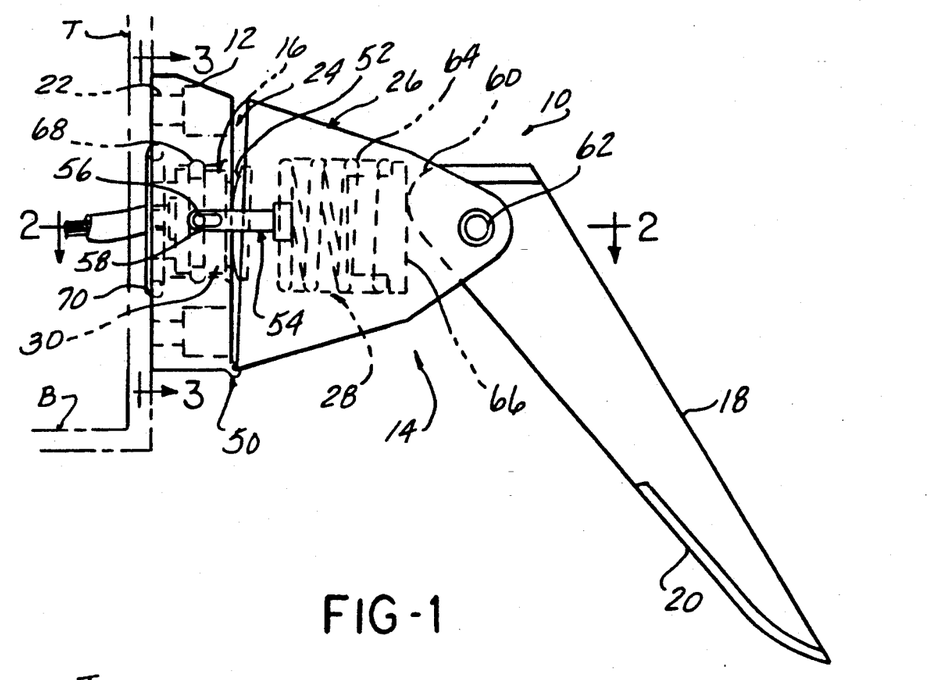
FIG. 1 is a side elevational view of the pressure sensor means in accordance with the present invention.
Figure 2:
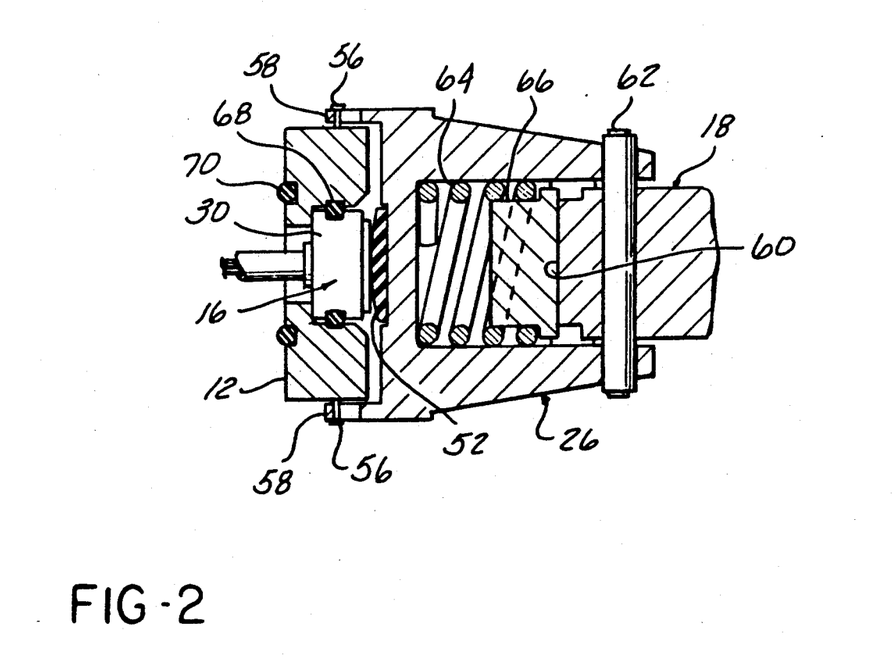
FIG. 2 is a top cross-sectional view of the pressure sensor means taken as shown in FIG. 1.
Figure 3:
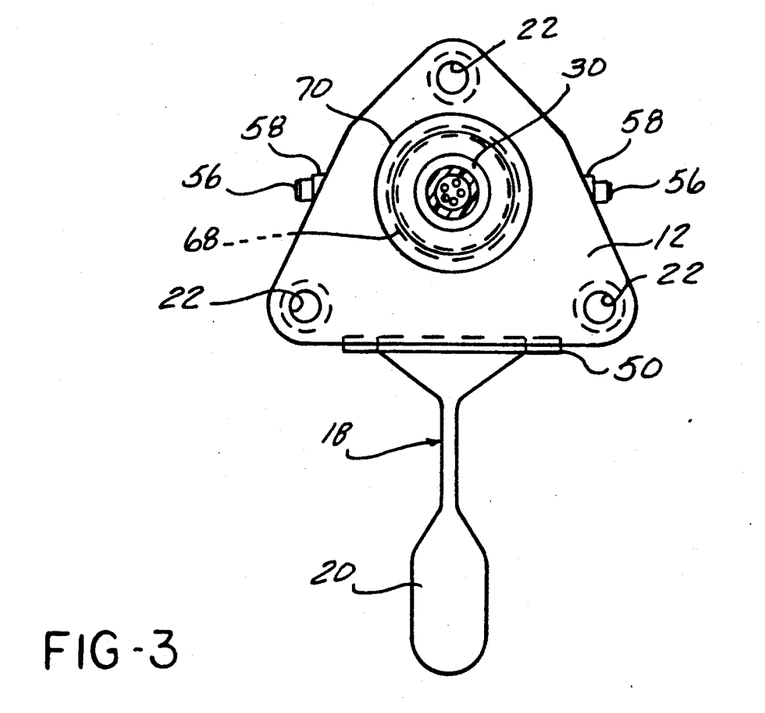
FIG. 3 is an end elevational view taken as shown in FIG. 1.

In the preferred embodiment shown in FIGS. 1 through 3, the lever means 14 includes paddle means 18 pivotally connected to the base member 12 at one end, through or via arm means 26, and having a surface 20 facing upstream relative to the fluid flow adjacent an opposite end. The paddle means 18 could be directly pivotally connected to the base member 12 to eliminate arm means 26 and the trip-up means 28. The paddle means 18 could incorporate a break-away feature to protect the signal means 16 and to reduce the overall cost of measuring means 10. The paddle means 18 is for receiving, amplifying and transferring force to the signal means 16, where the force corresponds to the dynamic fluid pressure applied to the paddle means by the fluid flowing with respect to the relative reference member. The paddle means 18 is disposed to extend a sufficient distance from the base and any surrounding structure to be exposed directly to the fluid flowing passed the relative reference member. In the case of a marine vessel, this would require the lever means 14, or, more specifically, the paddle means 18, to extend in a generally downward direction to a position below the lower edge of the transom or stern, so that an operable portion of the surface 20 is directly exposed to the fluid flow beneath the bottom of the marine vessel for subsequent transmittal of force to the signal means 16 by the lever means 14. The dynamic fluid flow measuring means 10 is fastened in a conventional manner by screws or bolts passing through apertures 22 formed in the base member or portion 12 to fasten the base member 12 to the boat transom or stern T, such that a portion of lever means 14 or, more specifically, paddle means 18 is exposed slightly below the boat bottom B. The 15 base member 12 is designed to protect the signal means 16, while the lever means 14, or more specifically paddle means 18, is designed to maximize dynamic pressure sensitivity by resolving the largest pressure component possible, while minimizing drag, fluid spray and any tendency to catch debris. The actual shape and configuration of the paddle means 18 and, more particularly, the area and shape of surface 20, may generally take any desired form provided the lever design maintains sufficient surface area to be acted on by fluid flow pressure under all expected operating conditions. For example, the lever and paddle must be appropriately designed to maintain continued exposure to fluid flow below a marine vessel when the vessel is being operated at low speeds, as well as after the vessel has begun hydroplaning at high speeds.

It should be apparent to those skilled in the art that the present invention of a lever-operated dynamic fluid flow measuring means 10 has many applications, including numerous applications in the marine vessel environment. For example, the dynamic fluid flow measuring means 10 can be adapted for connection to power boats, competition ski boats, sailboats, sailboards, jet skis, fishing boats and pleasure boats. In addition, the connection between the base member 12 and the marine vessel can be adapted for standard mounting configurations already in commercial use. Therefore, the present dynamic fluid flow measuring means 10 can be applied for immediate use with original equipment manufacturer applications, as well as after market applications with minimum vessel modifications.

Stop means 24 is disposed on the base member for engagement with the lever means 14 The stop means 24 is for preventing excessive application of force through the lever means 14 to the signal means 16. For instance, in operation on a marine vessel, as the fluid pressure is applied to the lever means 14, more specifically, through paddle means 18, the force is preferably amplified by leverage while being transmitted to the signal means 16. The amplified force may exceed the rated capacity of the signal means, and cause damage, if adequate precautions are not taken. The stop means 24 may include one or more surfaces on the base member 12 which come into contact with the lever means 14 during movement of the lever means 14 with respect to the base member 12 to prevent further application of force to the signal means 16 beyond a predetermined maximum acceptable force.

The lever means 14 may also include arm means 26 connected between the base member 12 and the paddle means 18 for movement within a predefined arc relative to the base member in response to dynamic fluid flow pressure applied to the paddle means 18. The arm means 26 is connected to the base member 12 through pivotal joint 50 as best seen in FIGS. 1 and 3. The lever means 14, as seen in FIGS. 1 and 2, preferably includes trip-up means 28. The trip-up means 28 is disposed between the paddle means 18 and the arm means 26. The trip-up means 28 allows for rotation of the paddle means 18 independent of the arm means 26 in response to application of a force on the paddle means 18 in excess of a predetermined trip-up force. The trip-up means 28 is intended to protect against permanent damage to the paddle means 18 in the event that the paddle means 18 impacts debris carried by the fluid flow to be measured, or any other underwater obstruction, in the case of marine vessel use. The arm means 26 can also include a resilient pressure application pad 52 for direct contact with the signal means 16. The resilient pressure application pad 52 may be connected to the arm means 26, or may be integrally formed thereon. Releasable means 54 are provided for connecting the arm means 26 to the base member 12 to latch lever means 14 to base member 12 and limit 15 rotational movement of the lever means 14 with respect to the base member 12 to a predefined arc. The releasable means 54 positions the arm means 26 normally in generally close face-to-face proximity with the base member 12. The releasable means 54 may take the form of one or more outwardly extending pins or studs 56 for engagement within a slot formed in a resilient flexible outwardly extending latch member 58.

The trip-up means 28, as best seen in FIGS. 1 and 2, may include a cam surface 60 formed on the paddle means 18 adjacent a pivotal connection 62 to the arm means 26. Spring means 64 are disposed in between the arm means 26 and the paddle means 18. A reciprocal member 66 is biased by the spring means 64 into engagement with the cam surface 60 of the paddle means 18 with sufficient resistance and force to prevent movement of the paddle means 18 with respect to the arm means 26 until a force exceeding the predetermined trip-up force is applied to the paddle means 18. Therefore, under normal operating conditions, the lever means 14, including the arm portion 26 and the paddle portion 18, operate as a single integral unit pivoting around the rotational axis defined by pivotal joint 50 with respect to the base portion 12. This applies pressure to the signal means 16 through pressure application pad 52. The arm is kept within a predetermined distance of the base member by the latch member 58. If necessary, the latch member 58 can be released to allow the lever means 14 to pivot away from base member 12 in order to service the signal means 16 supported within the base member 12. If a force in excess of the predetermined trip-up force is applied to the paddle portion 18, the paddle portion 18 will rotate independently of the arm portion 26 about pivotal connection 62 as the force overcomes the spring bias applied to cam surface 60. In conjunction with this trip-up force application, preferably stop means 24 are provided to prevent over-application of force to the signal means 16 through the arm portion 26. It may be necessary to manually reposition the paddle portion 18 back into the normal operating orientation with respect to the arm portion 26 of the lever means 14 after actuation of the trip-up mechanism.

The signal means 16 of the present invention can take various forms. For purposes of illustration, a solid-state piezoresistive transducer means 30 is disclosed as the preferred embodiment of the present invention. The preferred embodiment of the invention can be seen in FIGS. 1 through 4. An alternative embodiment of the invention can be seen in FIG. 5 which will be described in greater detail below. Referring now to FIGS. 1 through 4, the signal means 16 preferably includes a solid state pressure sensing transducer means 30 for generating an electronic output signal corresponding to the force transmitted through the lever means 14 from fluid flowing with respect to the relative reference member.

The solid-state pressure sensing transducer means 30 is commercially available from IC Sensors located in Milpitas, Calif. The Model 84 sensor is a media compatible, solid-state pressure sensor that is intended for use in original equipment manufacturers' applications where long term stability is desired combined with low cost. The stainless steel housing structure uses silicone oil to couple a diffused, piezoresistive sensor to a convoluted, flush stainless steel diaphragm that can be interfaced with most harsh media. The Model 84 is designed to be mounted using an O-ring as a face seal or a bore seal to maintain pressure integrity. Integral temperature compensation is provided along with calibration over 0° to 50° C. with laser trimmed resistors. No external resistors are required. An additional laser trimmed resistor is included to normalize pressure sensitivity variations by programming the gain of an external amplifier, thus providing ±1% interchangeability along with high level output.

Figure 4:
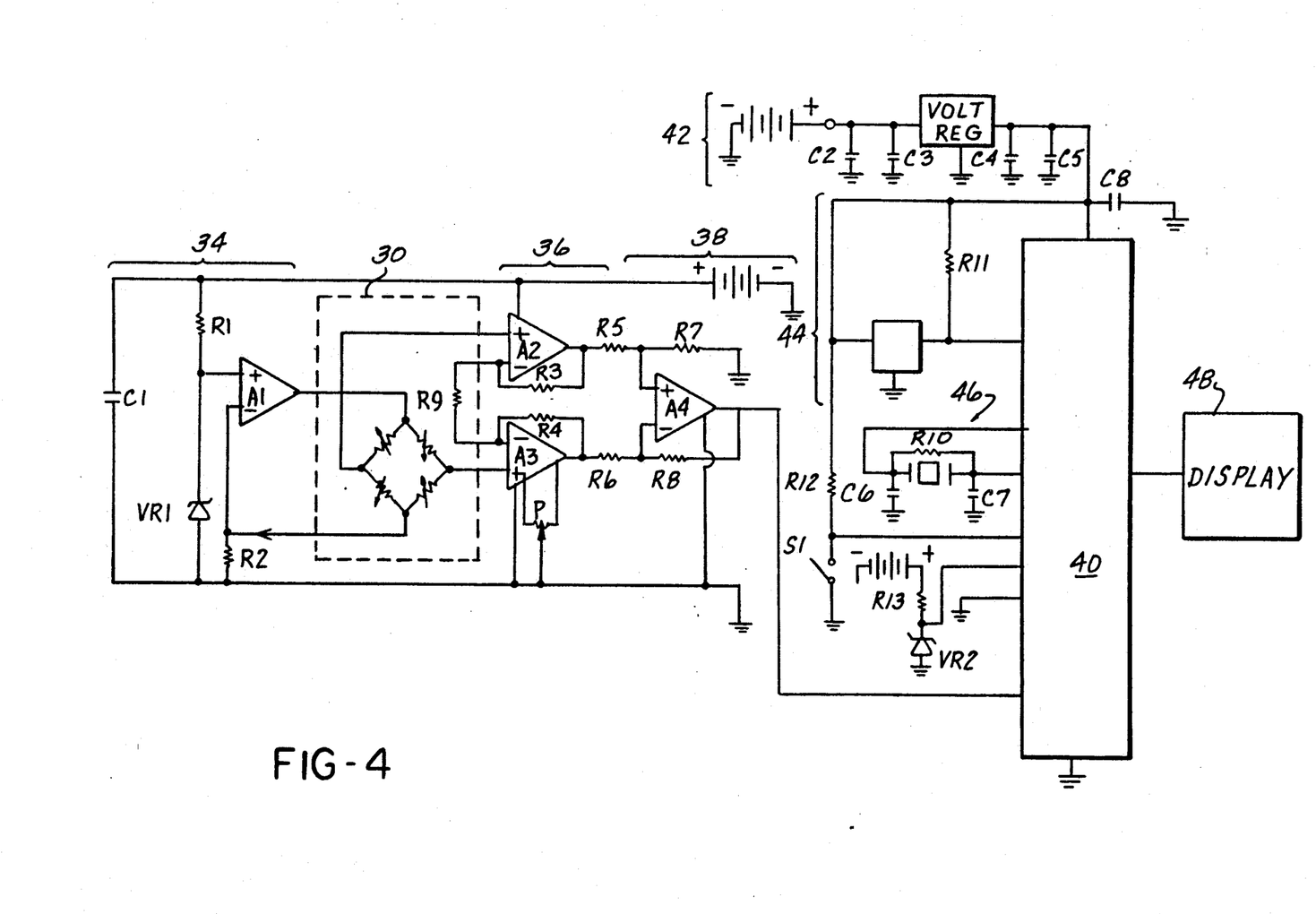
FIG. 4 is an electrical schematic diagram for a pressure sensor system according to the present invention.

A schematic diagram of the electrical circuitry of the present invention is best seen in FIG. 4. The dynamic pressure sensing transducer means 30 is connected to a precision constant current source 34 for sensor excitation and to an instrumentation differential amplifier 36 with the gain programmed by sensor feedback resistor R9. It should be recognized that circuit modifications could be made to obtain outputs other than 0 to 5 volts as used in the present invention. The current source 34 is controlled by the ±1% band-gap reference diode VR. Selecting amplifier A1 with an offset voltage below 1 mV and a ±1% tolerance of resistor R2 delivers current with typical accuracy of ±1.08%. The first differential stage of the instrumentation amplifier 36, i.e., A2 and A3, has a zeroing potentiometer P. For OP227 amplifiers A2 and A3, the zero range is typically ±4 mV in reference to the input with a differential offset below 0.5 mV. This leaves approximately ±3.5 mV zeroing range for the compensation of the sensor offset which typically is below ±1 mV. The second stage of the amplifier 38, i.e., A4 provides additional amplification through resistors R5, R6, R7 and R8, and translates the differential floating voltage from the first stage into a single ended output voltage.

The overall accuracy of the span voltage is affected by the accuracy of resistors R3 through R8. Using ±0.1% resistors, such as Mepco/Electra 5063Z, a typical gain error will be about ±0.24%. The accuracy error may be decreased when matched thin film resistors are used, such as Beckman 694-3-A. The combined span error of the entire signal conditioning circuit at a reference temperature will then be typically about 1.1% without any adjustment or pressure testing. This will be superimposed on the sensor's accuracy of ±1%. If additional calibration and normalization is desired, resistor R2 can be replaced with a series combination of a potentiometer and a resistor. The potentiometer can be adjusted to set the bridge excitation current to achieve the exact span voltage with full scale pressure applied to the sensor.

The output from the single ended amplifier A4 is fed to a central processing unit, for example a microcontroller 40, such as a Motorola MC68HC805B6. A low voltage regulator 42 maintains voltage to the microcontroller 40 at preferably 5 volts. A low voltage detection circuit 44 monitors the voltage and if the voltage is low automatically resets the microcontroller 40 until the voltage comes back up to an acceptable level. A crystal oscillator clock 46 provides base timing for the microcontroller 40 and associated circuitry. A scale conversion input switch S1 allows the microcontroller 40 to convert between desired scales, such as miles per hour to knots. Switch S1 supplies voltage to the microcontroller 40 for one scale and connects to ground for a different scale. A precision voltage reference means formed by R13 and VR2 provides a 5.0 volt reference to the analog to digital converter in the microcontroller.

Experience with prototypes of the invention disclosed in soon-to-be-issued U.S. Pat. No. 5,007,286 has shown that it is desirable to provide means for zeroing adjustment and means for gain adjustment in the amplifier circuit. The zeroing adjustment means was required to account for varying tolerances of different electrical components, such as the amplifier circuit and/or pressure sensor. A gain adjustment was required for what were variations from the theoretical values. The variations were believed to be due to the angle of inclination of the sensor surface with respect to the direction of fluid flow, the shape of the sensor housing, and potential flow incongruities at the sensor surface. Therefore, it is believed that these sensor adjustments may be required in the present preferred embodiment. In addition, means for filtering out background noise and extraneous pressure pulses prior to signal processing was desirable. This was accomplished by adding resistor R14 and capacitor C9 as shown in FIG. 4.

The display means 48 can be a liquid crystal display, such as a Hitachi Model No. HI333C-C for receiving the processed electronic output signal from the central processing means 40 and for displaying a visual readout of vessel speed based on the processed electronic output signal. In the alternative, the display means 48 can include a quartz (Aircore) speedohead display driven by a frequency input from the central processing means 40, or a light emitting diode display driven as a function of a 0-5 volt input directly from the pressure sensing transducer amplifier. As fluid pressure is applied to the lever means 14, or more specifically, to the paddle means 18, the force is amplified by leverage, i.e., force acting through a distance, while being transmitted to the sensor diaphragm. The lever pressure on the sensor diaphragm causes an internal pressure transfer to a piezoresistive element via a fluid coupling, with virtually no physical movement of the sensor diaphragm, thus reducing any mechanical criticality.

The pressure applied to surface area 20 of paddle means 18 is transmitted through arm means 26 to the sensor diaphragm of transducer means 30 via pressure application pad 52. The pad 52 is selected of a material to evenly distribute the transmitted force from the lever means 14 over the active area of the sensor diaphragm. The pad 52 is also selected to allow compression, and consequently pivotal rotation of lever means 14 limited by stop means 24. The pressure applied to the sensor diaphragm, just prior to engagement of stop means 24, is in between the maximum normal operating pressure and the rated sensor overload pressure. In other words, the pad 52 is selected of a compressible material such that when a predetermined pressure, which is greater than the maximum normal operating pressure, but less than the rated sensor overload pressure, is applied to the pad via the lever means, the arm engages the stop means on the base. After engagement of the stop means, if pressure is increased further, when a predetermined trip-up force is reached, the trip-up mechanism can be actuated. In the alternative, the trip-up force could be set to a value lower than the force necessary to engage stop means 24, provided that the trip-up force is greater than the force corresponding to the maximum normal operating pressure. The base member 12 is designed to house the signal means 16, and more particularly, in the preferred embodiment, the solid state pressure sensing transducer means 30, such that the sensor leads or connections are isolated from the fluid. A spanner nut can be used to compress an O-ring between the sensor and the base member 12, thereby creating a water-tight seal or an O-ring 68 can be fitted on the sensor diameter to maintain a water-tight seal and retain the sensor in the base member 12 as shown in FIG. 1. In addition, a second O-ring 70 may be positioned between the base member 12 and the relative reference member, such as boat transom T.

While the transducer means 30 can communicate with the central processing unit 40 through modulations of frequency, voltage or the like, it is preferable to convert the control signal into digital form for transmission to the central processing unit 40. As previously mentioned, the present invention positions the signal means 16, i.e., a pressure responsive signal generator, such as a solid state pressure sensor means 30 or a closed hydraulic circuit means 72, in the base member 12 for protection from direct impact by debris carried in the fluid flow to be measured. This protection is important for expensive components, such as the solid state pressure sensing piezoresistive transducer, which is costly to replace. In addition, protecting the signal means 16 from direct impact increases the reliability and durability of the entire fluid flow measuring apparatus. Furthermore, the present invention advantageously actuates the signal means 16 through lever means 14 movable with respect to the base member 12. The lever means 14 preferably provides leverage to amplify the force transmitted to the signal means 16, thereby allowing the system to be tailored to a particular dynamic range or resolution for a given application.

Figure 5:
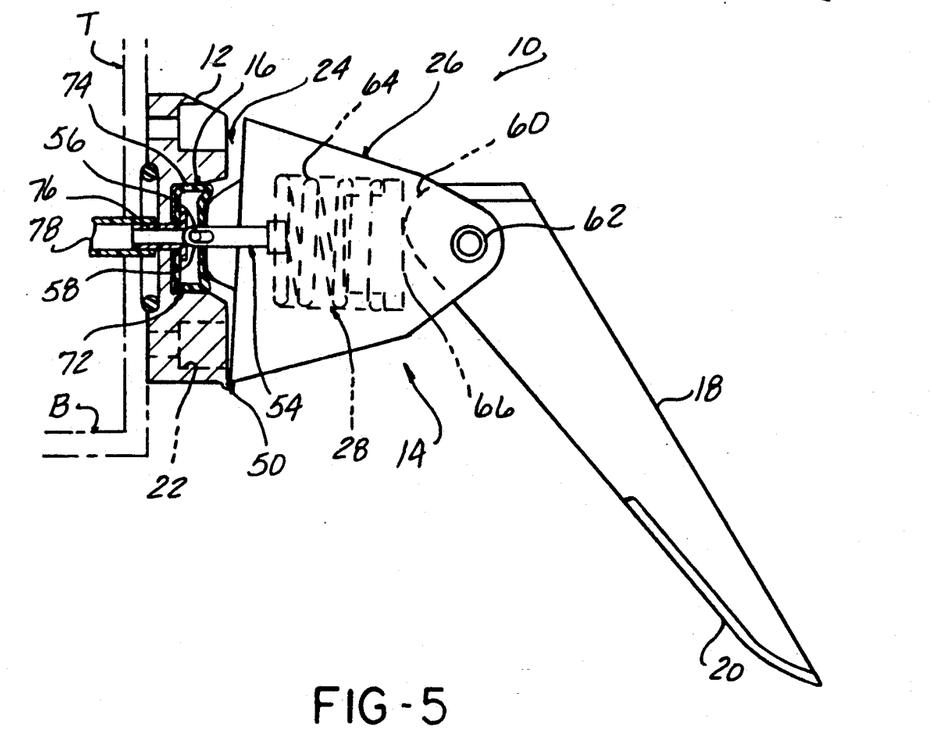
FIG. 5 is a partial cutaway view of another embodiment of the present invention.

An alternative embodiment of the present invention is shown in FIG. 5 of the drawings, and discloses a closed hydraulic means 72 for generating an output signal corresponding to the force transmitted through the lever means 14 from fluid flowing with respect to the relative reference member, such as a marine vessel. More specifically, the closed hydraulic means 72 can include a resilient, flexible bladder means 74 filled with a generally incompressible fluid. The bladder means 74 is disposed within the base member 12 and is actuated by compression in response to the force transmitted through the lever means 14. The bladder means 74 may take the form of a rubber bladder inserted within an aperture formed in the base member 12. The bladder may be held in position by a bladder fastener 76. The closed hydraulic means 72 could also include generally non-expandable fluid passage means 78. The first end of the fluid passage means 78 is in communication with the fluid within the bladder means 74 for transmitting an output signal, in this instance, a pressure signal as opposed to an electronic signal as in the preferred embodiment, from the bladder means 74 to a remote second end of the fluid passage means 78. The second end of the fluid passage means 78 is provided for connection to a display means 48, such as a dial with a hydraulically driven mechanical pointer, to be driven by the closed hydraulic circuit output pressure signal, or other appropriate signal processing means. The output pressure signal from the closed hydraulic means 72 corresponds to the dynamic pressure transmitted through the lever means 14 from fluid flowing with respect to the relative reference member, such as a marine vessel. The lever means 14 for the closed hydraulic circuit embodiment of the present invention can take any of the previously described configurations as set forth for the solid state pressure sensing transducer means 30 embodiment of the signal means 16. Therefore, the lever means 14 may include a paddle means 18 and arm means 26, as previously described. In addition, the lever means 14 may also include trip-up means 28 disposed between the paddle portion and arm portion as previously described.

While the above embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A dynamic fluid flow measurement apparatus intended to be connected to a first member for support relative to fluid flowing with respect to the first member, the dynamic fluid flow measurement apparatus comprising:
    a base member intended to be connected to said first member;
    a lever moveable about a hinge axis relative to said base member in response to fluid flow passed said first member, said lever transmitting a force corresponding to dynamic fluid flow pressure applied to said lever, said lever having a first surface pivotable toward and away from said base member; and
    signal means supported by said base member and positioned between said base member and said lever such that said signal means has a second surface operably engageable with said first surface of said lever and means for protecting said second surface from direct impact with debris carried in fluid flowing passed said lever, said signal means actuated by said force transmitted through said lever, said signal means generating an output signal corresponding to said force transmitted through said lever in response to fluid flow with respect to said first member.

2. The dynamic fluid flow measurement apparatus of claim 1 wherein said signal means further comprises:
    solid-state pressure sensing transducer means for generating an electronic output signal corresponding to said force transmitted through said lever from fluid flowing with respect to said first member.

3. The dynamic fluid flow measurement apparatus of claim 2 wherein said solid-state pressure sensing transducer means further comprises:
    a piezoresistive transducer sensor for sensing force transmitted through said lever;
    constant current source means for exciting said piezoresistive transducer sensor;
    differential amplifier means for amplifying a difference between two input signals from said piezoresistive transducer sensor into a differential floating output signal; and
    single ended amplifier means for translating said differential floating output signal into a single output signal with reference to a ground.

4. The dynamic fluid flow measurement apparatus of claim 1 further comprising:
    central processing means for receiving said output signal from said signal means and for generating a processed electronic output signal in accordance with a control program stored in memory.

5. The dynamic fluid flow measurement apparatus of claim 4, wherein said central processing means further comprises:
    a central processing unit;
    low voltage regulator means for supplying constant voltage to said central processing unit;
    low voltage detection and reset means for protecting said central processing unit against low voltage by holding said central processing unit in a reset condition during low voltage detection;
    crystal oscillator clock means for providing base timing for said central processing unit;
    scale conversion means for changing said processed electronic output signal to reflect a different scale reading to be displayed; and
    precision voltage reference means to allow the central processing unit to accurately read said output signal independent of any voltage regulator variation.

6. The dynamic fluid flow measurement apparatus of claim 1 further comprising:
    display means for receiving said output signal and for displaying a visual readout of relative speed based on said output signal.

7. The dynamic fluid flow measurement apparatus of claim 6, wherein said display means is selected from a group consisting of a liquid crystal display, a vacuum fluorescent display, a light emitting diode display, a dial with an electronically driven mechanical pointer driven by said output signal, and a dial with a hydraulically driven mechanical pointer driven by said output signal.

8. The dynamic fluid flow measurement apparatus of claim 1 wherein said signal means further comprises:
    closed hydraulic means for generating an output signal corresponding to said force transmitted through said lever from fluid flowing with respect to said first member.

9. The dynamic fluid flow measurement apparatus of claim 8 wherein said closed hydraulic means further comprises:
    resilient flexible bladder means filled with a generally incompressible fluid, said bladder means disposed within said base member and actuated by pressure applied from said lever in response to said force transmitted through said lever; and
    generally non-expandable fluid passage means having first and second ends, said first end of said fluid passage means in communication with said fluid within said bladder means, said fluid passage means for transmitting an output signal from said bladder means to said second end, said output signal corresponding to said dynamic pressure transmitted through said lever from fluid flowing with respect to said first member.

10. The dynamic fluid flow measurement apparatus of claim 1 wherein said lever further comprises:

paddle means, pivotally connected to said base member at one end and having a surface adjacent an opposite end, said surface facing upstream relative to said fluid flow, said paddle means for receiving, amplifying and transferring said force to said signal means, said force corresponding to direct dynamic pressure from said fluid flowing with respect to said first member; and stop means, disposed on said base member for engagement with said paddle means, for preventing excessive application of force through said paddle means to said signal means.

11. The dynamic fluid flow measurement apparatus of claim 10 wherein said lever further comprises:

arm means pivotally connected between said base member and said paddle means for movement within a predefined arc relative to said base member in response to said dynamic pressure applied to said paddle means; and trip-up means, disposed between said paddle means and said arm means, for allowing rotation of said paddle means independent of said arm means in response to application of a force on said paddle means exceeding a predetermined trip-up force.

12. The dynamic fluid flow measurement apparatus of claim 11 wherein said trip-up means further comprises:

said paddle means having a cam surface adjacent said pivotal connection to said arm means;

spring means disposed in between said arm means and said paddle means; and a reciprocal member biased by said spring means into engagement with said cam surface of said paddle means with sufficient resistance to prevent movement of said paddle means with respect to said arm means until a force exceeding said predetermined trip-up force is applied to said paddle means.

13. The dynamic fluid flow measurement apparatus of claim 1 further comprising:

protection means for protecting said signal means from damage due to impact between said lever and debris carried by said fluid flowing passed said first member.

14. A dynamic fluid flow measurement apparatus intended to be connected to a marine vessel comprising:

a base member intended to be connected to said marine vessel;

an arm connected to said base member through a pivotal joint allowing rotation of said arm with respect to said base member, said arm moveable about said pivotal joint relative to said base member in response to fluid flow passed said marine vessel, said arm having a first surface pivotable toward and away from said base member;

an elongated paddle connected to said arm through a pivotal joint adjacent one end, said pivotal joint allowing rotation of said paddle with respect to said arm, said paddle having a cam surface adjacent said pivotal joint and a forwardly facing surface adjacent an end opposite said pivotal joint, said forwardly facing surface disposed toward a bow of said marine vessel, said paddle for transmitting a force corresponding to dynamic fluid flow pressure applied to said paddle by fluid with respect to said marine vessel;

trip-up means disposed between said paddle and said arm, said trip-up means for allowing rotation of said paddle independent of said arm in response to application of a force on said paddle exceeding a predetermined trip-up force, said trip-up means including a spring disposed in between said arm and said paddle, and a reciprocal member biased by said spring member into engagement with said cam surface of said paddle with sufficient resistance to prevent movement of said paddle with respect to said arm until a force exceeding said predetermined trip-up force is applied to said paddle; and signal means supported by said base member and positioned between said arm and said base member such that said signal means has a second surface operably engageable with said first surface of said arm and said second surface is protected from direct impact with debris carried in fluid flowing passed said elongated paddle, said signal means for actuation by said force transmitted through said paddle and said arm, said signal means for generating an output signal corresponding to said force transmitted through said paddle and arm from said fluid flowing relative to said marine vessel.

15. The dynamic fluid flow measurement apparatus of claim 14 wherein said signal means comprises:

solid-state pressure sensing transducer means for generating an electronic output signal corresponding to said force transmitted through said paddle and said arm from fluid flowing with respect to said marine vessel.

16. The dynamic fluid flow measurement apparatus of claim 14 further comprising:

display means for receiving said output signal and for displaying a visual readout of marine vessel speed based on said output signal.

17. The dynamic fluid flow measurement apparatus of claim 14 further comprising:

releasable means for connecting said arm to said base member to limit rotational movement of said arm with respect to said base member to a predefined arc, said releasable means positioning said arm normally in close face to face proximity with said base member; and stop means, disposed on said base member for engagement with said arm, for preventing excessive application of pressure through said arm to said signal means.

18. A dynamic fluid flow measurement apparatus intended to be connected to a marine vessel comprising:

a base member intended to be connected to said marine vessel;

an arm connected to said base member through a pivotal joint allowing rotation of said arm with respect to said base member;

an elongated paddle connected to said arm through a pivotal joint adjacent one end, said pivotal joint allowing rotation of said paddle with respect to said arm, said paddle having a cam surface adjacent said pivotal joint and an enlarged forwardly facing surface adjacent an end opposite said pivotal joint, said forwardly facing surface disposed toward a bow of said marine vessel, said paddle for transmitting a force corresponding to dynamic fluid flow pressure applied to said paddle by fluid flowing with respect to said marine vessel;

trip-up means disposed between said paddle and said arm, said trip-up means for allowing rotation of said paddle independent of said arm in response to application of a force on said paddle exceeding a predetermined trip-up force, said trip-up means including a spring disposed in between said arm and said paddle, and a reciprocal member biased by said spring member into engagement with said cam surface of said paddle with sufficient resistance to prevent movement of said paddle with respect to said arm until a force exceeding said predetermined trip-up force is applied to said paddle; and signal means disposed between said arm and said base member for actuation by movement of said arm relative to said base member, said signal means for generating an output signal corresponding to said force transmitted through said paddle and arm from said fluid flowing relative to said marine vessel, wherein said signal means includes closed hydraulic means for generating an output signal corresponding to said force transmitted through said paddle and said arm from fluid flowing with respect to said marine vessel.

19. A dynamic fluid flow measurement apparatus intended to be connected to a marine vessel comprising:

a base member intended to be connected to said marine vessel;

an arm connected to said base member through a pivotal joint allowing rotation of said arm with respect to said base member;

an elongated paddle connected to said arm through a pivotal joint adjacent one end, said pivotal joint allowing rotation of said paddle with respect to said arm, said paddle having a cam surface adjacent said pivotal joint and an enlarged forwardly facing surface adjacent an end opposite said pivotal joint, said forwardly facing surface disposed toward a bow of said marine vessel, said paddle for transmitting a force corresponding to dynamic fluid flow pressure applied to said paddle by fluid flowing with respect to said marine vessel;

trip-up means disposed between said paddle and said arm, said trip-up means for allowing rotation of said paddle independent of said arm in response to application of a force on said paddle exceeding a predetermined trip-up force, said trip-up means including a spring disposed in between said arm and said paddle, and a reciprocal member biased by said spring member into engagement with said cam surface of said paddle with sufficient resistance to prevent movement of said paddle with respect to said arm until a force exceeding said predetermined trip-up force is applied to said paddle;

signal means disposed between said arm and said base member for actuation my movement of said arm relative to said base member, said signal means for generating an output signal corresponding to said force transmitted through said paddle and arm from said fluid flowing relative to said marine vessel; and central processing means for receiving said output signal from said signal means and for generating a processed electronic output signal in accordance with a control program stored in memory.

20. A dynamic fluid flow measurement apparatus intended to be connected to a first member for support relative to flowing fluid with respect to the first member, the dynamic fluid flow measurement apparatus comprising:

a base member intended to be connected to said first member;

a lever movable relative to said base member in response to fluid flow with respect to said first member, said lever for transmitting a force corresponding to dynamic fluid flow pressure applied to said lever;

signal means supported by said base member and positioned between said base member and said lever, such that the signal means is operably actuated by said force transmitted through said lever to said signal means and said signal means is protected from direct impact with debris carried in fluid flowing passed said lever, said signal means for generating an output signal corresponding to said force transmitted through said lever in response to fluid flow with respect to said first member; and central processing means for receiving said output signal from said signal means and for generating a processed electronic output signal in accordance with a control program stored in memory.

* * * * *